Figure 1:
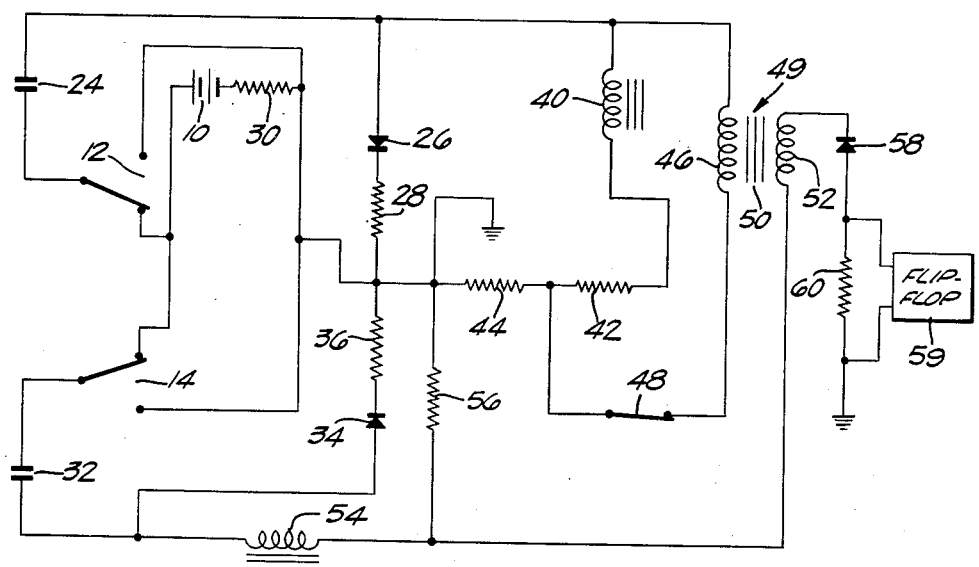

Jan. 15, 1957  J. E. RICHARDSON  2,777,959
CONTROL APPARATUS FOR PRODUCING PULSES
Filed Oct. 17, 1955

JOHN E. RICHARDSON
INVENTOR.

BY
Ellsworth R. Roston
ATTORNEY.

United States Patent Office 2,777,959
Patented Jan. 15, 1957

2,777,959

CONTROL APPARATUS FOR PRODUCING PULSES

John E. Richardson, Los Angeles, Calif., assignor to The Magnavox Company, Los Angeles, Calif., a corporation of Delaware Application October 17, 1955, Serial No. 540,702

8 Claims. (Cl. 307—88)

This invention relates to a system for producing output pulses and more particularly to a system for producing output pulses on an asynchronous basis in accordance with the operation of an input member.

In recent years, pulse techniques have been used for a wide variety of purposes. For example, pulse techniques are used in digital computers and data processing systems. Pulse techniques are also used to control the movements of such output members as a cutting tool. Sometimes the pulses have had to be generated on a synchronous basis with respect to time such that a pulse is generated after each constant interval of time. At other times, pulses are required on an asynchronous basis in which a pulse should be produced only in synchronization with the occurrence of a particular input phenomenon. This input phenomenon may occur on a completely random basis with respect to time.

This invention provides a system in which an input phenomenon of a mechanical nature is converted into an output electrical pulse. The input pulse may be represented by the rotation of a shaft in which the speed of the shaft may vary considerably at different times. At a particular position in each rotation of the shaft, an output pulse is produced. The output pulse occurs at the particular position in a shaft revolution only if a control phenomenon such as an electrical input pulse has been introduced to the apparatus. This causes the system to operate on a synchronous basis with respect to the shaft rotation but on an asynchronous basis with respect to time to produce an output pulse upon each introduction of an input pulse.

The invention includes a magnetic member having a saturable magnetic core and a pair of windings. At a first position in each revolution of the input shaft, flux of a first polarity is produced in a first one of the windings in the magnetic member. While the flux of the first polarity is being produced, a switch is maintained open to prevent a load member such as a solenoid from being energized by a voltage induced in the second winding of the magnetic member. At a second position in each revolution of the shaft, the switch becomes closed and flux of an opposite polarity is produced in the second winding of the magnetic member. The voltage produced in the second winding of the magnetic member by the change in the flux in the winding is introduced to the output member such as the solenoid to energize the solenoid. In this way, an output pulse is produced every time that the shaft rotates through the second position.

Biasing means are also included to control the production of flux of the first polarity in the magnetic member in each rotation of the shaft. When the biasing means produces a first voltage, flux of the first polarity is able to be produced in the magnetic member during a shaft revolution. This causes flux of the second polarity to be produced at a subsequent time in the shaft revolution and a pulse of output voltage to be produced. When a second voltage is produced by the biasing means, flux of the first polarity cannot be produced during a shaft revolution. This prevents flux of the second polarity from being produced at a subsequent time in the shaft revolution and prevents an output voltage from being induced.

An object of this invention is to provide a system for producing output pulses on an asynchronous basis with respect to time but on a synchronous basis with respect to an input phenomenon.

Another object is to provide a system for converting an input phenomenon represented by a mechanical motion into electrical pulses synchronized with respect to the input phenomenon.

A further object is to provide a system for producing saturable magnetic fluxes to control the generation of output pulses in synchronism with the occurrence of input phenomena.

Still another object is to provide a system for converting a direct voltage of relatively low amplitude into sharp and strong electrical pulses in synchronism with the occurrence of an input phenomenon.

A still further object is to provide in a system of the above character a voltage having a first amplitude for obtaining the production of an output pulse in each shaft revolution and having a second amplitude for inhibiting the production of the output pulse in each shaft revolution.

Other objects and advantages will be apparent from a detailed description of the invention and from the appended drawings and claims.

Figure 2:
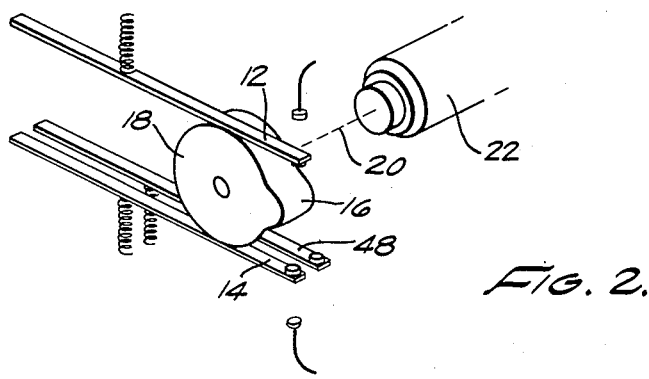
Figure 3:
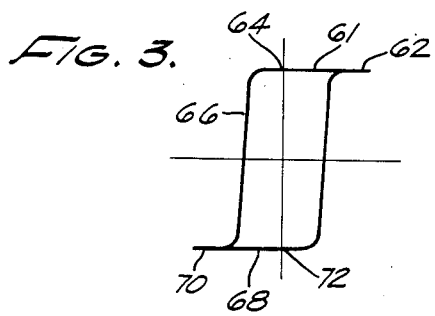

In the drawings:

Figure 1 is a circuit diagram somewhat schematically illustrating an asynchronous system constituting one embodiment of the invention;

Figure 2 is an enlarged perspective view of certain switches forming a part of the embodiment shown in Figure 1 and also includes certain members such as a motor and a cam for actuating the switches in a particular sequence of operation; and Figure 3 is a curve illustrating certain operating characteristics of a saturable-core magnetic member forming an important part of the embodiment shown in Figure 1.

In the embodiment of the invention shown in Figure 1, an asynchronous system is provided which includes a source of direct voltage such as a battery 10. The positive terminal of the battery 10 is connected in Figure 1 to the lower stationary contact of a first switch 12 and to the upper terminal of a second switch 14. Each of the switches 12 and 14 is of a single-pole, double-throw construction in which the movable contacts of the switches are spring-loaded as shown in Figure 2 to obtain a normal engagement between the movable contact and a particular one of the stationary contacts. For example, the movable contact of the switch 12 is spring-loaded to normally engage the lower stationary contact of the switch and the movable contact of the switch 14 is spring-loaded to normally engage the upper stationary contact of the switch.

The movable contacts of the switches 12 and 14 are adapted to be actuated by a lobe 16 on an input member such as a rotatable cam 18 (Figure 2). The movable contact of the switch 12 is displaced along the cam 18 by an angular distance of approximately 180° with respect to the movable contact of the switch 14 so as to produce a substantially symmetrical actuation of the switches 12 and 14 in each revolution of the cam. The cam 18 is mounted on a shaft 20 for rotation, the shaft being driven by a motor 22. The motor 22 may be of a synchronous type to rotate at a constant speed or of a type in which the speed varies in accordance with changes in the load imposed on the motor or of any other suitable type.

The movable contact of the switch 12 is connected to one terminal of a capacitance 24 having a suitable value such as approximately four microfarads. A connection is made from the other terminal of the capacitance 24 to the plate of a unidirectional member such as a diode 26. A resistance 28 is connected between the cathode of the diode 26 and ground. The upper stationary contact of the switch 12 in Figure 1 is grounded, as is one terminal of a resistance 30. The other terminal of the resistance 30 has a common connection with the negative terminal of the battery 10.

A capacitance 32 having a value corresponding to that of the capacitance 24 has a common connection at one terminal with the movable contact of the switch 14. The other terminal of the capacitance 32 is connected to the plate of a diode 34 having characteristics corresponding to those of the diode 26. A connection is made from the cathode of the diode 34 to one terminal of a resistance 36 having a value corresponding substantially to that of the resistance 28. The other terminal of the resistance 36 is grounded, as is the lower stationary contact of the switch 14 in Figure 1.

An output member such as a solenoid 40 has a common connection with the plate of the diode 26. A pair of resistances 42 and 44 are in series between the solenoid 40 and ground. One terminal of a primary winding 46 is also connected to the plate of the diode 26. A connection is made from the other terminal of the primary winding 46 to the stationary contact of a signle-pole, single-throw switch 48 having its movable contact connected to the common terminal between the resistances 42 and 44. The movable contact of the switch 48 is positioned relative to the cam lobe 16 in a manner similar to the movable contact of the switch 14. This causes the switch 48 to become opened at the same time that the movable contact of the switch 14 is depressed into engagement with the lower stationary contact of the switch.

The primary winding 46 is included in a magnetic member such as a transformer generally indicated at 49. A saturable core 50 and a secondary winding 52 are also included in the transformer 49. The core 12 may be provided with a toroidal shape so as to have a complete continuity with no air gaps or it may be provided with any other suitable shape. The core 50 may be made from a ferrite material designated as S1, S2 or S3 by the General Ceramic and Steatite Corporation of Keasbey, New Jersey. This material is a ferromagnetic ceramic molded from powdered particles. The core 50 may also be made from a material designated as "Orthonol" by Magnetics, Inc., of Butler, Pennsylvania.

The winding 52 in the transformer 48 may be provided with approximately the same number of turns as the winding 46 or with any other number of turns. Connections are made from one terminal of the winding 52 to the common terminal between an inductance 54 and a resistance 56, the inductance and resistance being in series between the plate of the diode 34 and ground. The other terminal of the winding 52 is connected to the cathode of a diode 58, the plate of which is connected to a grounded resistance 60. A control member is adapted to apply a voltage across the resistance 60. The control member may be a bistable member such as a flip-flop. The flip-flop 59 may be adapted to provide a first voltage having a relatively negative voltage of large amplitude and a second voltage having a positive voltage or a negative voltage of low amplitude.

As has been previously described, the movable contact of the switch 12 normally engages the lower stationary contact of the switch in Figure 1 because of the spring-loading of the movable contact. This causes a continuous circuit to be established which includes the battery 10, the lower stationary and movable contacts of the switch 12, the capacitance 24, the diode 26, the resistance 28 and the resistance 30. The current flowing through this circuit charges the capacitance 24 to a voltage approaching that provided by the battery 10. The current is in a direction to produce a positive charge on the lower terminal of the capacitance 24 in Figure 1.

In each revolution of the cam 18, the lobe 16 actuates the movable contact of the switch 12 into engagement with the upper stationary contact of the switch. This causes the charging circuit from the battery 10 through the capacitance 24 to become interrupted so that the capacitance cannot be further charged. The capacitance 24 is unable to discharge through a circuit including the capacitance, the movable and upper stationary contacts of the switch 12, the resistance 28 and the diode 26. This results from the fact that the discharge of the capacitance through the diode 26 would be in a direction in which the impedance of the diode is quite high.

Upon an engagement between the movable contact and the upper stationary contact of the switch 12, the capacitance 24 discharges through a circuit including the capacitance, the movable and upper stationary contacts of the switch 12, the resistance 44, the resistance 42 and the solenoid 40. The discharge occurs in a relatively short and sharp pulse because of the particular values chosen for the capacitance and the solenoid. This results from the fact that the capacitance 24 and the solenoid 40 form a circuit resonant at a relatively high frequency which is greater than twice the speed of rotation of the shaft 20.

In like manner, the capacitance 32 becomes charged by a flow of current from the battery 10 when the movable contact of the switch 14 engages the upper stationary contact of the switch. The capacitance 32 becomes charged through a circuit including the battery 10, the upper stationary and movable contacts of the switch 14, the capacitance, the diode 34, the resistance 36 and the resistance 30. When the lobe 16 depresses the movable contact of the switch 14 into engagement with the lower stationary contact of the switch in Figure 1, the capacitance 32 discharges through a circuit including the capacitance, the movable and lower stationary contacts of the switch 14, the resistance 56 and the inductance 54. The discharge occurs in a relatively short and sharp pulse because of the resonant characteristics provided for the capacitance 32 and the inductance 54.

Since the discharge current from the capacitance 32 flows downwardly in Figure 1 through the resistance 56, a potential negative with respect to ground is produced at the common terminal between the resistance and the inductance 54. This causes current to flow through a circuit including the resistance 60, the diode 58, the secondary winding 52 and the resistance 56. The current flows downwardly in Figure 1 through the winding 52 and continues during the discharge of the capacitance 32. The downward flow of current through the winding 52 can be considered as being in a direction to produce magnetic flux of a positive polarity in the core 50 of the transformer 49.

In order to understand the contribution of the transformer 49 to the asynchronous pulse generator, the magnetic characteristics of the transformer must first be described. Since the transformer 49 includes the saturable core 50, the application of a sufficient amount of ampere-turns to the core by the flow of current through one of the transformer windings causes the core to become saturated. A positive saturation of the core 50 is indicated at 61 in Figure 3. Such a positive saturation is produced by a downward flow of current through the winding 52 in a manner similar to that described above.

When the core 50 becomes saturated with flux of a positive polarity, a further application of ampere-turns to the core by the downward flow of current through the winding 52 produces no further flux of any appreciable intensity in the core. This is indicated at 62 in Figure 3. Since no further flux of any appreciable intensity is produced in the core 50, no voltages are induced in the winding 46 upon the imposition of ampere-turns to the winding 52 after the positive saturation of the core. Upon the interruption of the positive ampere-turns applied to the core 50, the flux in the core remains at a saturating intensity as indicated at 64 in Figure 3.

When a sufficient amount of negative ampere-turns are applied to the core 50, the core experiences a magnetic reaction through a dynamic region indicated at 66 such that flux of a negative polarity is produced in the core. By applying negative ampere-turns of a sufficient intensity to the core 50, negative flux of saturating intensity is produced in the core. This is indicated at 68 in Figure 3. Upon a negative saturation of the core 50, the further application of negative ampere-turns to the core produces no further appreciable increase in the flux in the core. This is indicated at 70 in Figure 3. The negative flux in the core remains at a saturating intensity even after the interruption of the negative ampere-turns, as indicated at 72 in Figure 3.

The switch 48 remains open during the time that current is flowing downwardly through the winding 52 to saturate the core 50 with flux of a positive polarity. The switch 48 remains open during this time since the lobe 16 on the cam 18 actuates the movable contact of the switch 25 at the same time that it depresses the movable contact of the switch 14 into engagement with the lower stationary contact of the switch. Since the switch 48 remains open, current is not able to flow through the primary winding 46. This prevents a load from being imposed on the transformer 49 while a positive flux of saturating intensity is being produced in the core 50. It also prevents any current from flowing through the output member 40. In this way, no output pulses are developed across the output member 40.

When the cam 18 has rotated through one-half of a revolution after its actuation of the switches 14 and 48, the lobe 16 moves into position to raise the movable contact of the switch 12 into engagement with the upper stationary contact of the switch in Figure 1. This causes the capacitance 24 to discharge through a circuit including the resistance 42 and the solenoid 40 in a manner similar to that disclosed above. The discharge occurs in a short and heavy pulse because of the resonant characteristics of the solenoid 40 and the capacitance 24. The discharge is in an upward direction through the solenoid 40 in Figure 1. At the time that the discharge of the capacitance 24 occurs, the switch 48 remains closed since the lobe 16 has moved past the movable contact of the switch. This causes the primary winding 46 to be placed in parallel with the series branch formed by the resistance 42 and the solenoid 40.

Because of the disposition of the primary winding 46 across the resistance 42 and the solenoid 40, current flows upwardly through the winding in Figure 1 at the same time that current flows through the solenoid. This current is in a direction opposite to the current which previously flowed through the winding 52. Since the current flows upwardly through the winding 46, it tends to produce a negative flux in the core 50. The current is of a sufficient intensity to produce a negative flux of saturating intensity in the core 50 such as that indicated at 68 in Figure 3.

During the time that the flux in the core 50 is changing from a saturating intensity of positive polarity to a saturating intensity of negative polarity, a voltage is produced across the winding 46. During this time, an output pulse is also produced across the solenoid 40 since the solenoid is connected across the primary winding 46. Upon the saturation of the core 50 with flux of a negative polarity, no further flux can be produced in the core even upon a continued flow of current through the winding 46. This prevents any voltage from being developed across the winding 46.

Since the resistance 42 and the solenoid 40 are connected across the winding 46, no voltage would be developed in the solenoid upon the saturation of the core 50 with flux of negative polarity. In this way, the output pulse produced in the solenoid 40 is limited in duration to the time required for the core 50 to become saturated. By using the transformer 49 to control the duration of the pulse produced in the output member 40, the characteristics of the pulse are further sharpened.

As has been described previously, current flows through a circuit including the resistance 60, the diode 58, the secondary winding 52 and the resistance 56 during the shaft rotation to reset the core 50 with saturating flux of a positive polarity. This occurs when the flip-flop 59 introduces a positive voltage or a negative voltage of low amplitude to the plate of the diode 58 so that the voltage on the plate of the diode is more positive than the voltage on the cathode. When the core 50 becomes reset during the rotation of the shaft 22, a voltage pulse can be produced in the transformer 49 upon a discharge of the capacitance 24. This in turn causes an output pulse to be produced in the solenoid 40 in a manner similar to that described above.

At certain times, the flip-flop 59 may introduce a negative voltage of relatively large amplitude to the plate of the diode 58. This causes the voltage on the plate of the diode 58 to become negative with respect to the voltage on the cathode of the diode. Because of this potential relationship, current cannot flow through the secondary winding 52 to reset the core 50 with saturating flux of a positive polarity. Since the flux in the core 50 remains at a saturating intensity of negative polarity, the subsequent discharge of the capacitance 24 produces relatively little additional flux. This prevents any voltage from being developed across the winding 46 upon the discharge of the capacitance 24. Since no voltage pulse is developed across the winding 46, no voltage pulse can be produced in the solenoid 40 because of the parallel relationship of the winding and the solenoid.

The output pulses produced in the solenoid 40 may be used in a wide variety of ways. For example, the pulses may be used to actuate an armature controlling the positioning of an output member. The output pulses may also be used in other ways such as to initate the sweep of an oscilloscope. By using the circuit shown in Figure 1 and described above, the oscilloscope sweep would be initiated at a particular time in each revolution of an input member such as the shaft 20.

It should be appreciated that the output pulses in the solenoid are produced on a synchronous basis with respect to each occurrence of a phenomenon. This phenomenon is represented in the drawings as the rotation of a cam such as the cam 18 to a position in which the lobe 16 actuates the movable contact of the switch 12. However, it should be appreciated that pulses may be produced in synchronization with the occurrence of other phenomena than the rotation of a shaft. Although the pulses are produced in synchronization with the occurrence of a phenomenon, the pulses may be completely asynchronous with respect to time. The pulses are asynchronous with respect to time when the phenomena controlling the production of the pulses do not occur at a uniform rate. The pulses are produced upon the occurrence of the input phenomena only when proper control signals are simultaneously produced, such as a positive voltage or a negative voltage of low amplitude from the flip-flop 59.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination, a relay, a magnetic member including a core having properties of saturation and having properties for inhibiting the production of any voltage across the magnetic member upon the saturation of the core, an output member connected across the magnetic member to receive a flow of current during the production of voltage across the magnetic member, a switch connected in a circuit with the magnetic member, means for alternately opening and closing the switch, means for alternately producing a flow of current in one direction through the magnetic member during the opening of the switch to produce flux of a particular polarity in the magnetic member, and means for alternately producing a flow of current in an opposite direction through the magnetic member during the closure of the switch to produce a flow of current through the magnetic member for the production of saturating flux of a polarity opposite to the particular polarity and to produce a voltage pulse in the output member during the production of the saturating flux.

2. In combination, a magnetic member including a core having properties of flux saturation and having properties for inhibiting the production of any voltage across the magnetic member upon the saturation of the core with flux of one polarity and upon the flow of current in a direction to produce flux of the same polarity in the core, an output member connected across the magnetic member to become energized upon the production of flux of a particular polarity in the magnetic member, a switch connected in a circuit with the magnetic member, means for alternately opening and closing the switch, means for producing during the opening of the switch a flow of current through the magnetic member in a direction to provide flux in the magnetic member of a polarity opposite to the particular polarity, and means for producing during the closure of the switch a flow of current through the magnetic member in a direction to provide flux of the particular polarity in the memory member for the energization of the output member.

3. In combination, a magnetic member including a core saturable with magnetic flux and having a pair of windings magnetically coupled to the core, means for providing input phenomena having first and second characteristics recurrent on an alternating basis, means for producing a flow of current through a first one of the windings in a direction for generating magnetic flux of a first polarity in the core upon the occurrence of the input phenomenon with the first characteristics, a switch for preventing the flow of any current through the second winding during the flow of current through the first winding, means including the switch for providing a flow of current through the second winding in a direction for generating magnetic flux of a second polarity in the core upon the occurrence of the input phenomenon with the second characteristics, and an output member connected to the second winding to produce an output signal upon the generation of the magnetic flux of the second polarity in the core.

4. In combination, a magnetic member having a saturable core and first and second windings disposed in magnetic proximity to the core to produce saturating fluxes of opposite polarities, means for limiting the flow of current through a first one of the windings in a first direction, means for providing first and second phenomena recurrent on an alternating basis, means for providing a flow of current through the first winding in the second direction upon each occurrence of the first phenomenon, means for preventing any flow of current through the second winding upon each occurrence of the first phenomenon and for permitting a flow of current through the winding upon each occurrence of the second phenomena, means for providing a flow of current through the second winding in the first direction upon each occurrence of the second phenomenon, and an output member connected to the second winding to receive an output pulse upon the flow of current through the second winding.

5. In combination, a magnetic member including a core having properties of saturation and including a pair of windings magnetically coupled to the core, a first switch having first and second positions, a first chargeable member, means for charging the first charging member in the first position of the switch, a second chargeable member, a second switch having first and second positions, means for charging the second charging member in the first position of the second switch, a third switch connected in a circuit with a first one of the windings to prevent the flow of current through the winding when opened, means for alternately actuating the first and second switches into the second positions of the switches and for opening the third switch upon the actuation of the second switch into its second position, means operative upon the actuation of the second switch into its second position for producing a flow of current through the second winding in the magnetic member in a direction to saturate the core with flux of a first polarity, means operative upon the actuation of the first switch into its second position for producing a flow of current through the first winding in a direction to saturate the core with flux of a second polarity opposite to the first polarity, and an output member connected to the first winding to pass a current pulse upon the flow of current through the first winding.

6. Apparatus as set forth in claim 1 in which control means are provided to bias the magnetic member against the production of flux of the particular polarity in the magnetic member and against the subsequent production of flux of the opposite polarity in the magnetic member and the production of a voltage pulse in the output member.

7. Apparatus as set forth in claim 3 in which means are provided to bias the first winding at particular times with a voltage for preventing the flow of current through the winding during the occurrence of the input phenomena with the first characteristics and to bias the first winding at other times with a voltage for obtaining the flow of current through the winding during the occurrence of the input phenomena with the first characteristics for a control of the production of the output signals in accordance with the bias applied to the first winding.

8. Apparatus as set forth in claim 4 in which means are provided to obtain a flow of current through the first winding upon certain occurrences of the first phenomenon and to prevent a flow of current through the first winding upon other occurrences of the first phenomenon for a control of the production of the output pulses upon the occurrences of the second phenomenon.

No references cited.